United States Patent [19]

Porrmann et al.

[11] Patent Number: 4,563,231
[45] Date of Patent: Jan. 7, 1986

[54] TUBULAR CASING, PROCESS FOR ITS MANUFACTURE, AND ITS USE AS A SAUSAGE CASING

[75] Inventors: Herbert Porrmann, Niedernhausen; Walter Seifried, Wiesbaden; Ludwig Klenk, Hallgarten; Karl Stenger, Ruedesheim, all of Fed. Rep. of Germany

[73] Assignee: Hoechst Aktiengesellschaft, Frankfurt am Main, Fed. Rep. of Germany

[21] Appl. No.: 498,524

[22] Filed: May 26, 1983

Related U.S. Application Data

[62] Division of Ser. No. 325,041, Nov. 25, 1981, Pat. No. 4,401,136.

[30] Foreign Application Priority Data

Nov. 29, 1980 [DE] Fed. Rep. of Germany ....... 3045086

[51] Int. Cl.[4] .......................................... B32B 33/00
[52] U.S. Cl. ............................ 156/90; 156/187; 156/200; 156/203; 156/218; 156/229; 156/304.6; 426/135; 53/451; 53/545
[58] Field of Search ............... 156/90, 187, 194, 200, 156/203, 270, 272.2, 275.1, 275.3, 275.7, 304.6, 307.3, 229, 218, 466, 84, 496; 53/450, 451, 545; 426/105, 135, 137

[56] References Cited

U.S. PATENT DOCUMENTS

| | | | |
|---|---|---|---|
| 2,210,436 | 8/1940 | Weingand et al. | 427/230 |
| 2,686,725 | 8/1954 | Cornwell | 99/176 |
| 2,796,362 | 6/1957 | Wooding et al. | 427/402 |
| 2,998,341 | 8/1961 | Vaughan | 156/229 |
| 3,224,885 | 12/1965 | Shiner | 264/191 |
| 4,020,141 | 4/1977 | Quinn et al. | 264/289 |
| 4,192,904 | 3/1980 | Gerigk et al. | 428/510 |
| 4,283,426 | 8/1981 | Schenk et al. | 426/105 |
| 4,356,199 | 10/1982 | Hammer et al. | 428/105 |
| 4,356,200 | 10/1982 | Hammer et al. | 426/105 |

*Primary Examiner*—David Simmons
*Assistant Examiner*—Merrell C. Cashion
*Attorney, Agent, or Firm*—Schwartz, Jeffery, Schwaab, Mack, Blumenthal & Evans

[57] ABSTRACT

Disclosed is a tubular casing of fiber-reinforced regenerated cellulose comprising a film web which is curved to form a tube. The edge regions of the film web, which run parallel to the longitudinal axis, abut or overlap slightly and are sealed by means of a film strip which covers both the edge regions. The film web and the film strip composed of the same material have, in the wet remoistened stage, a breaking strength of about 15 to 30 N/mm$^2$ and an elongation at break of about 30 to 50% in the longitudinal direction of the web, and a breaking strength of about 15 to 35 N/mm$^2$ and an elongation at break of about 30 to 50% in the transverse direction of the web. The breaking strength in the transverse direction of the web is equal to or greater than that in the longitudinal direction of the web. On its entire surface facing the film strip, the tubular casing has a substantially gas-impermeable and sealable layer, as has the film strip on the surface which comes into contact with the tubular casing. The film web is produced from viscose, and is prevented from shrinking during the process and is stretched in the transverse direction during drying. The tubular casing finds particular application as a sausage casing.

15 Claims, 7 Drawing Figures

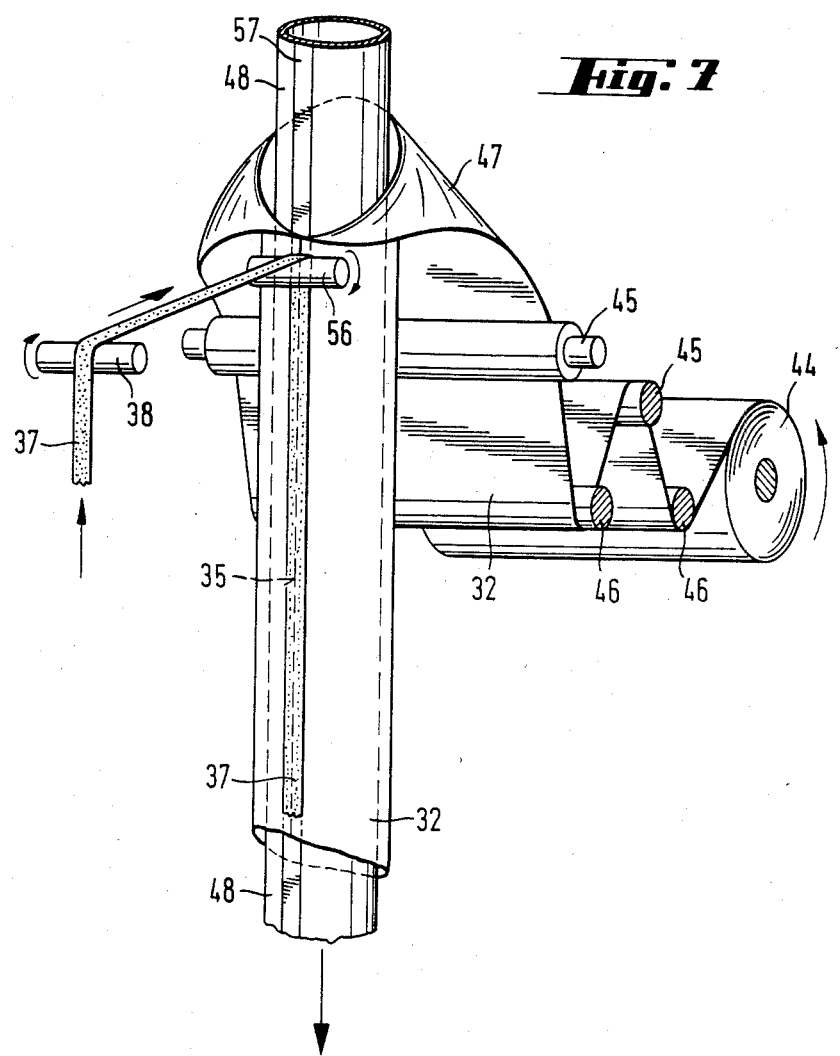

TUBULAR CASING, PROCESS FOR ITS MANUFACTURE, AND ITS USE AS A SAUSAGE CASING

CROSS REFERENCE TO RELATED APPLICATION

The present application is a divisional application of U.S. Ser. No. 325,041, filed Nov. 25, 1981, now U.S. Pat. No. 4,401,136.

BACKGROUND OF THE INVENTION

The present invention relates to a tubular casing for foodstuffs, in particular for use as a sausage casing, to a process for its manufacture, and to its use as a sausage casing for boiled sausages and cooked sausages, in particular sausages of the liver sausage type.

Tubular casings made from a web, for example, of regenerated cellulose, which are manufactured by folding the web along the longitudinal axis and gluing the overlapping edge zones running parallel to the longitudinal axis are already known (see, e.g., U.S. Pat. Nos. 2,148,884, 2,226,442, 2,685,769, 2,685,770, 2,757,495 and 2,773,773). The gluing operations hitherto described comprise either the use of solvents with which the surface of the web is incipiently dissolved and tackified, whereupon an "adhesive" is produced in situ on the surface of the web, or the use of webs which are coated with a thermoplastic resin or are composed of a thermoplastic material which can be sealed when heat and pressure are applied.

Thus, U.S. Pat. No. 2,653,432 describes a process for bonding the overlapping edges of a film which, for example, can also be composed of regenerated cellulose and, if appropriate, includes a fiber reinforcement, by means of a strip of thermoplastic material which is located between the overlapping edges and becomes tacky on heating. Polyvinylidene chloride is mentioned as an example of this thermoplastic material. This known tubular casing can also have a moisture-tight coating on the outside, the overlapping edges then being kept free of coating and the remaining surface being kept free of thermoplastic material. The casing material can be pre-stretched, preferably in the longitudinal direction.

This old process, which has been known for about 30 years, is hardly used any longer, particularly because an overlapping seam formed by sealing of the superposed edge zones is not sufficiently strong and is also completely unsatisfactory for reasons of appearance. In the meantime, sausage casings have exclusively been manufactured from seamless material, although some disadvantages must be accepted in the case of these seamless tubes.

Seamless tubes of fiber-reinforced regenerated cellulose are usually manufactured by the following essential process steps. A web of non-woven fiber is formed to give the shape of a tube, the edges of which overlap and are glued with viscose. After one-sided or two-sided coating with viscose from annular slot dies, the tube is coagulated, regenerated to give cellulose hydrate gel, and dried. During this process, the tube is supported by the gas mixture formed during the coagulation and regeneration. During drying, it is supported by an enclosed volume of air which has been introduced and, if appropriate, it is stretched in the longitudinal and transverse directions in order to improve the mechanical properties.

Disadvantageously, weakened zones, so-called spinning edges, which run parallel to the longitudinal axis in the edge region appear, for example, on the edges of the gel tube laid flat. Moreover, the stretching process also has disadvantages.

Neither the internal pressure of the process gases nor the internal pressure during drying can be controlled with sufficient accuracy, so that the diameter of the tubes cannot be kept constant within narrow limits. A further disadvantage is that, when tubes are stretched by means of an expanding gas, the ratio of the stretching forces acting in the tangential and axial directions is fixed, so that, for this reason, the mechanical properties of the seamless tube are also fixed, in particular the shrinking properties and the strength in the longitudinal and transverse directions.

The internal coating which is required for the use of the tube as a sausage casing for boiling sausages and cooked sausages and which is composed, for example, of a material which is impermeable to water and water vapor, is introduced in solution or dispersion into the interior of the seamless tube. This is expensive in terms of process engineering and can be troublesome. The solvent or dispersing agent must, for example, in a process step which takes a long time, diffuse through the wall of the tube to the outside. Moreover, the film formation on the inner surface of the tube is difficult to control. Finally, the mechanical properties which have been established at great cost during the manufacture of the tube are frequently disadvantageously changed by the coating process. Since the tubes must be laid flat immediately after coating, there is a considerable risk of the water vapor-impervious coating layer being damaged or weakened in the region of the squeezed edge. These coating defects have the result that the filling is spoiled, or becomes unattractive, due to loss of water or access of oxygen.

SUMMARY OF THE INVENTION

It is therefore an object of the invention to provide a fiber-reinforced tubular casing which is composed of regenerated cellulose and does not have the disadvantages of the seamless tubular casing and which, rather has optimum mechanical properties, in particular shrinkage values, and which, moreover, can be provided in a simpler manner with a coating which is impervious to oxygen, water and water vapor, without a significant change in the mechanical properties.

It is a further object of the present invention to provide a tubular casing of regenerated cellulose which has a fiber reinforcement and which can be manufactured in a simpler manner from a web.

It is also an object of the invention to provide a tubular casing which has an internal coating of a material impermeable to oxygen and water vapor which can be applied before the tube is formed, without adversely affecting the strength of the casing in the seam region.

Another object of the present invention is to provide a straight, essentially curvature-free casing which has a seam and which, even under the action of water and on shrinking, retains its curvature-free form, even in the seam region.

It is yet another object of the present invention to provide an opening aid which enables the casing to be removed from the contents more easily and hygienically, without weak points of the tubular casing having to be provided.

Still another object of the present invention is to provide a process for providing a tubular casing having improved mechanical properties combined with a coating which is impervious to oxygen, water and water vapor.

An additional object of the present invention is to provide a tubular casing having improved mechanical properties in combination with an oxygen-, water- and water vapor-impervious coating which can be used as a sausage casing for boiling sausages and cooked sausages.

In accomplishing the foregoing and other objects, there has been provided in accordance with one aspect of the present invention a casing for foodstuffs, comprising a web material formed into a tubular casing by curving the longitudinally running edges of the web material around the longitudinal axis of the web material and meeting or overlapping the edges, wherein the web material comprises a fiber-reinforced regenerated cellulose comprising, in the wet remoistened state, in the longitudinal direction of the web, a breaking strength of about 15 to 30 $N/mm^2$ and an elongation at break of about 30 to 50% and, in the transverse direction of the web, a breaking strength of about 15 to 35 $N/mm^2$ and an elongation at break of about 30 to 50%, the breaking strength in the transverse direction of the web being equal to or greater than the breaking strength in the longitudinal direction of the web; a film strip covering the regions adjacent to the edges whereby the film strip bonds the edges of the cellulose film and wherein the film strip comprises fiber-reinforced regenerated cellulose having the same values as the web material with respect to the breaking strength and the elongation at break and having, at least on the surface coming into contact with the tubular casing, a layer containing a gas-impermeable and sealable material; and a substantially gas-impermeable and sealable layer on the surface of said tubular casing facing the film strip.

In another aspect of the present invention there is provided a process for the manufacture of a tubular casing from a fiber web, comprising the steps of coating a fiber web with a viscose, coagulating and regenerating the viscose to produce a cellulose hydrate gel, washing and drying the cellulose hydrate gel to free acids and salts from the cellulose hydrate gel, forming the fiber web into a tube, bonding the longitudinally running edges of the web material by means of a film strip, wherein the fiber web is held by the edges, at least during coagulating and/or regenerating the viscose to produce the cellulose hydrate gel, to prevent shrinkage of the fiber web, and stretching the fiber web during drying by about 5 to 15% in the transverse direction relative to the width of the fiber web before the coating with the viscose.

In still another aspect of the present invention there is provided a sausage casing for boiling sausages and cooked sausages manufactured from the casing described above.

Further objects, features and advantages of the present invention will become apparent from the detailed description of the preferred embodiments which follows when considered with the attached drawings.

BRIEF DESCRIPTION OF THE DRAWINGS

The invention is explained in more detail by reference to FIGS. 1 to 7. In the drawings:

FIGS. 3, 4 and 7 are perspective views schematically illustrating alternatives for the manufacture of a tube from the web;

DETAILED DESCRIPTION OF PREFERRED EMBODIMENTS

Figure 1:
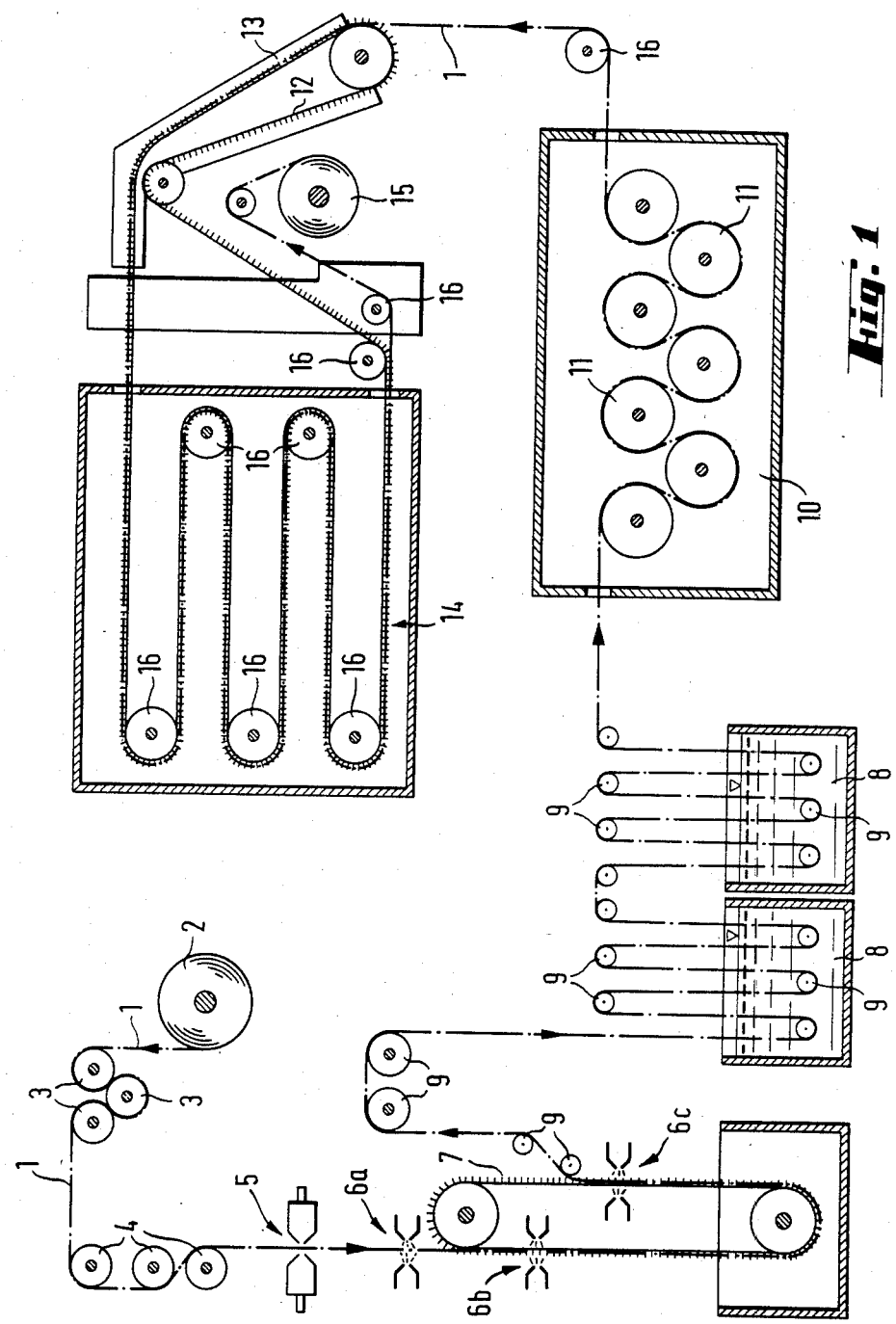
FIG. 1 schematically illustrates the manufacture according to the invention of the fiber-reinforced web from regenerated cellulose.

According to the present invention, a sheet-like or web-like rectangular piece of film which is curved around its longitudinal axis, or a correspondingly curved continuous film web, is formed into a tubular casing and the edges, which have been brought together flush or in overlapping manner, are bonded by means of a film strip. For simplicity, instead of "sheet-like or web-like pieces" and "continuous webs", only the term "webs" is used in the following text. On the tube surface facing the film strip, there is a layer of thermoplastic material which is impermeable to oxygen, water and water vapor, is largely gas-tight and at the same time is sealable. If appropriate, this layer is anchored on the web surface by means of an adhesion-promoting layer.

When the web is formed into a tube, with its edges overlapping, additional bonding of the edge regions takes place in the overlapping region, if an adhesion-promoting layer is used. This is due to the fact that the adhesion-promoting layer is not only present between the web surface and the gas-tight sealing coating; but, during application to the web surface, it also penetrates through the web to the opposite web surface. The bonding in the overlapping region then takes place between the adhesion-promoting surface layer of one edge region and the gas-tight sealable surface layer of the other edge region.

On its surface which comes into contact with the tube surface, the film strip carries a sealable coating which is preferably composed of the same material as the sealable coating, which is impermeable to oxygen, water and water vapor, of the tube. For simplicity, only gas-impermeable coating is referred to in the following text. The gas-impermeable coating is, in particular, a thermoplastic copolymer which contains vinylidene chloride monomer units and which, if appropriate, is anchored to the carrier surface by means of an adhesion-promoting layer. It has proved to be particularly advantageous when a gas-impermeable layer of this type is present on both surfaces of the film strip.

The film strip appropriately has a width of about 5 to 15% of the tube circumference and is composed of the same carrier material as the web material, that is to say it is composed of fiber-reinforced regenerated cellulose, having the same strength values in the longitudinal and transverse directions.

Surprisingly, this film strip can also be used as a tear-open tape for the filled tube, in particular for sausage casings, which are to be peeled off the contents without great effort. For this purpose, small incisions are made in the sausage casing immediately to the right and left adjacent to the film strip, for example after the sausage has been initially cut, so that the film strip and the part of the casing sealed by means of the latter form a kind of gripping tab. Surprisingly, when this gripping tab is pulled, the sausage casing tears, in a smooth tearing line in the direction of the longitudinal axis, to the right and left adjacent to the film strip.

The tube is formed, for example, either on a sufficiently long path, so that distortion and formation of folds do not occur, or by deflection over a shoulder-like forming tool. The two lateral edges of the web are adjacent, substantially without a spacing, or they overlap slightly. By means of transport elements gripping around the tube circumference, the tube is moved over the surface of a support body located in the interior of the tube. Before the seam is closed, the film strip is introduced, with its sealing layer pointing in the direction of the inner surface of the tube, in such a way between the surface of the support body and the abutting edges of the web that the butt seam formed by the edges of the web forms the center line of the film strip, which covers both edge zones to substantially the same width. Sealing is effected, for example, by contact with a sealing jaw preheated to a predetermined temperature. However, any other heat source can also be used for sealing, such as, for example, IR radiators, high-frequency heating or hot air.

Frequently, it is advantageous to exert an additional pressure on the sealing position. If a sealing jaw is used, it is advantageous when the movement of the web and the pressure-temperature sealing are carried out cyclically. It is, however, also possible to seal continuously, using a heated roller which is pressed onto the tube.

The sealing temperatures and pressures applied depend largely on the material properties of the sealing layers. When used according to the invention for boiled sausages and cooked sausages, gas-impermeable sealing layers are preferred which in the temperature range from about 120° to 150° C. by the process according to the invention, give internal tape seals which withstand the stresses occurring in use.

It is also possible to form the web into a tube in such a way that the layer which is gas-impermeable and suitable for sealing is on the outside of the tubular casing. In this case, the film strip is applied to the outside of the tubular casing.

The cellulose web is produced, in particular, by the viscose process. The fiber reinforcement likewise has the shape of a web, for example, a paper web with fibers such as are used in the manufacture of paper or rice paper. Natural fibers, such as hemp fibers or flax fibers, and likewise synthetic fibers, such as polyamide, polyester or polyacrylonitrile fibers, can also be used for reinforcing the cellulose web.

The web-like fiber reinforcement is, for example, a textile structure, such as an adhesively, mechanically or thermally consolidated non-woven fiber which comprises spun fibers, filaments or multiple filament yarns of a natural or synthetic material, which are deposited randomly or in an ordered fashion, or it is a woven fabric, network, lattice, a knitted fabric or the like.

The fiber web is preferably treated on both sides with a viscose solution, preferably by immersion in a viscose solution or coating with a viscose solution, for example, using slot dies, rollers or spraying devices, and the viscose solution is then converted into regenerated cellulose. It is also possible to incorporate into the viscose from about 10 to 80% by weight of reinforcing fibers, which expediently have an average fiber length of about 0.05 to 15 mm. The fibers are composed of synthetic organic fibers, of natural fibers, for example cotton fibers, or of fibrids (U.S. Pat. No. 2,999,788). The viscose containing fibers is then extruded through a die into the coagulation bath, whereupon a gel web is formed.

The viscose solution is an alkaline solution of sodium cellulose-xanthate and is usually prepared by reacting the alkali cellulose, which has been obtained from cellulose and sodium hydroxide solution, with carbon disulfide in an alkaline medium. In most cases, it still contains about 4 to 20% by weight of cellulose. After ripening, the viscose is applied to the fiber web and spun, i.e., coagulated. The spinning bath contains, for example, about 20 to 80 g/l of sulfuric acid, and also about 80 to 150 g/l of sodium sulfate and/or about 200 to 350 g/l of ammonium sulfate.

In further stages, the fiber-reinforced web-like product comprising a viscose gel is regenerated to cellulose hydrate gel in an acid medium, for example, in dilute (less than or equal to about 5% by weight) sulfuric acid, and the cellulose hydrate gel is washed with water to remove acid and salts, desulfurized, for example with sodium sulfite solution, optionally passed through a bleaching bath, and finally passed through a softening bath containing, for example, aqueous 5 to 20% strength glycerol, sorbitol or glucose solution (French Pat. No. 1,385,394).

The cellulose hydrate gel is converted into regenerated cellulose by intensive drying at about 90° to 140° C., and the regenerated cellulose is adjusted to a water content of about 5 to 15% by weight by conditioning. After drying, the fiber-reinforced cellulose hydrate webs have a thickness of about 50 to 200 μm, corresponding to a weight per unit area of about 50 to 250 g/m$^2$.

It is essential to the invention that the fiber web is held by the edges, so that shrinking of the web is prevented, in particular during the regeneration of the viscose and subsequently until the final drying process, but in some cases also even during the coating with viscose. The holding of the fiber web is effected, for example, by means of needle rollers, needle belts or needle chains which are formed in a single row or in several rows. These grip the two edges of the fiber web, so that the width of the web is kept constant during the entire process. The number of punctures in the edge zones is to be kept as small as possible, in order to minimize the reduction in the strength of the web. On the other hand, a sufficient number of punctures must be present in order to ensure adequate prevention of shrinkage. Chains of gripping clips or a cord-type guide of an acid- and alkali-resistant material, for example, of an appropriate plastic, can be used for holding the edges of the fiber web. In the case of the cord-type guide, the fiber web is held on both edges by means of one cord in each case, the edge being laid around this cord and being fixed by gluing or fusion under the action of heat, or by means of an adhesive. This cord runs, for example, in a guide rail. So-called full-width drawing rollers can also be used for keeping the web broad.

A further essential process step comprises preventing shrinkage of the web, obtained from the cellulose hydrate gel, during the drying process and at the same time additionally stretching it in the transverse direction, preferably by about 5 to 15%, in particular by about 7 to 12%, relative to the original width of the fiber web. If a slight shrinkage of the web in the transverse direction has occurred during the regeneration, the extent of transverse stretching during drying is correspondingly increased. Before this stretching, pre-drying is carried out, if necessary, during which the major part of the water is removed until the gel web has a water content of about 80 to 150% by weight.

More extensive stretching transverse to the direction of the web is not carried out, and an actual longitudinal stretching step is likewise omitted. The shrinkage of the web in the longitudinal direction, which occurs during the process, in particular on coagulation, regeneration and drying, is compensated primarily by the drawing force which is exerted on the web in the longitudinal direction and which is required in order to pull the web through the individual treatment stages.

The strength values of the web in the longitudinal and transverse directions, which are reached due to the shrinkage-preventing measures and the transverse stretching during the drying process, are essential for the manufacture of the tubular casing with a longitudinal seam and for the film strip which is composed of the same material and is to be used for bonding the edge zones of the web.

The tensile strength and elongation at break are measured by means of an electronic tensile strength tester according to DIN 53,455. The tensile strength is to be understood as the resistance of the specimen to the tensile stress at the moment of breaking. It is measured as the tensile force (N), relative to the cross section ($mm^2$). The elongation at break is the percentage elongation of the specimen, as compared with the original length, under stress at the moment of breaking, and it is given in percent. The specimen has a length of 100 mm, a width of 15 mm and thickness of 100 to 110 $\mu$m.

In the case of a wet specimen of the web material according to the invention, that is to say a specimen which has been soaked in water at 40° C. for 30 minutes, the tensile strength in the longitudinal direction is about 15 to 30, in particular about 20 to 30 $N/mm^2$, and the elongation at break is about 30 to 50%, in particular about 30 to 40%. The tensile strength in the transverse direction is equal to but preferably greater than the tensile strength in the longitudinal direction, and it has values of between about 15 and 35, in particular about 25 to 35 $N/mm^2$. The elongation at break in the transverse direction is within the same range of values as that in the longitudinal direction, i.e., it is about 30 to 50, in particular about 30 to 40%.

In the case of a dried specimen of the web material of the invention, which has a residual moisture content of about 8 to 10% by weight of water and contains about 20 to 24% by weight of glycerol, the tensile strength in the longitudinal direction is about 50 to 70, in particular about 55 to 65 $N/mm^2$ and the elongation at break is about 10 to 22%, in particular about 12 to 15%. The tensile strength in the transverse direction is equal to but preferably greater than the tensile strength in the longitudinal direction, and it has values of between about 50 and 75, in particular about 65 to 75 $N/mm^2$. The elongation at break of the dried specimen is about 8 to 19%, in particular about 8 to 12%.

If necessary, an adhesion-promoting layer is present between the gas-impermeable coating and the tubular casing. Adhesion promoters are to be understood as substances or mixtures of substances which are applied to the web surface before or simultaneously with the application of the coating, in order to improve the adhesion between the coating and the web surface. The adhesion-promoting layer is composed of an essentially water-insoluble resin, preferably a cured, cationic thermosetting resin which is essentially water-soluble in the uncured state and can be converted under the action of heat by progressive condensation reactions into the water-insoluble state. Polyurethane resins, nitrocellulose and other polymers known as water-insoluble anchoring agents can also be used. The adhesion-promoting layer is preferably applied to the web over the entire web width and, in particular, it is applied to the already regenerated cellulose hydrate gel web either before drying or after drying. The application is preferably carried out with an aqueous dispersion which contains up to about 25% by weight of the thermosetting resin and, if appropriate, also the gas-impermeable coating material. Subsequently, the coated web is heated to about 65° to 125° C. until the moisture content is less than about 10% by weight. Due to the heating, the resin is cured to give its water-insoluble form, and it enters a durable bond with the surface of the web. The resin layer has a weight per unit area of about 30 to 300 $mg/m^2$, preferably about 40 to 75 $mg/m^2$.

Lower aliphatic or aromatic hydrocarbons, lower alcohols or esters or mixtures of these solvents are employed as suitable solvents for the thermosetting resin. It is advantageous to use an aqueous solution or dispersion.

If desired for certain applications, an additional water-repellant resin, such as paraffin, montan wax or carnauba wax, and/or suitable thickeners, such as cellulose ether or starch, are applied to the web together with the thermosetting resin.

The tubular casing can also be printed with labelings or decorative patterns before, but preferably after application of the thermosetting resin and before the gluing. Advantageously, in addition to the printing processes customary in the manufacture of seamless sausage casings, other printing possibilities are also available since, in the present case, the flat web can be printed before shaping of the tube.

The coating of thermosetting resin is, for example, free from pigments and organic dyes and thus forms a clear layer through which any printing remains clearly visible. However, it is also possible to use a transparent organic dye, in order to impart a corresponding color to the packaging casing.

If appropriate, in addition to the thermosetting resin, the layer on the tubular casing can contain pigments, a plasticizer for the thermosetting resin and/or a curing agent for the thermosetting resin. The thermosetting resin and the plasticizer are taken up in a suitable liquid solvent or dispersing agent, which advantageously can be evaporated off at a temperature at which at least precuring of the resin can start at the same time.

A non-exclusive list of examples which may be mentioned for the thermosetting resin are: urea/formaldehyde, melamine/formaldehyde and phenol/formaldehyde resins. Preferred plasticizers used for these theremosetting resins are soft, non-curing resins of the alkyd type, or dibutyl phthalate, tricresyl phosphates or dibutyl sebacate.

Curing agents which can be employed for the thermosetting resin are, for example, ammonium thiocyanate, toluenesulfonic acid, maleic acid or lactic acid. These compounds act as catalysts in the curing of the thermosetting resins.

Particularly preferred thermosetting resins are condensation products of polyamide-polyamines or aliphatic polyamines or of polyamides with bifunctional halohydrins or derivatives thereof, for example, epichlorohydrin, such as are described, for example, in U.S. Pat. No. 2,573,956 or in British Pat. Nos. 865,727 and 908,205, the disclosures of which are herein incorporated by reference. A particularly suitable resin is, for example, the reaction product of an aliphatic 2,6-polyamide, diethylenetriamine and epichlorohydrin.

Possible polyamines are simle alkylene-diamines or polyalkylene-polyamines, for example diethylenetriamine, triethylenetetramine, tetraethylenepentamine and the corresponding polypropylenepolyamines, and polybutylene-polyamines, such as dibutylenetriamine. To manufacture the corresponding chlorohydrin resins, the polyamines are reacted with more than one mole of epichlorohydrin per mole of polyamine. In general, about 1.5 to 4 moles of epichlorohydrin, usually about 2 to 3 moles, are used. The reaction is carried out in an aqueous solution at a moderately elevated temperature (e.g., about 50° C.), until the desired degree of viscosity is reached. Reaction products of epichlorohydrin and dipropylenetriamine or bis-(3-aminopropyl)-methylamine are preferably used, with about 2.8 to 3.8 moles of epichlorohydrin being reacted with 1 mole of polyamine.

The polyamide-polyamines are condensation products of a saturated, aliphatic, dibasic acid which has about 3 to 8 carbon atoms in the molecule and one of the above-mentioned polyamines which has at least one secondary and two primary amine groups, such as the above-mentioned polyalkylene-polyamines. Diglycolic acid, succinic acid, glutaric acid and adipic acid are preferably used as the dibasic acid. It is also possible to use mixtures of dibasic acids. The mixtures of the acids can also contain acids with more than 8 carbon atoms in the molecule, as long as the proportion of these acids in the mixture does not prevent the polyamine-polyamide manufactured therefrom from being truly soluble or at least colloidally soluble in water. A proportion of the polyamines which are reacted with the dibasic acid can be replaced by alkylenediamines. The proportion of the latter can be up to about 30%. The reaction between the polyamine and the dibasic acid is carried at about 110° to 250° C., in most cases, at about 160° to 210° C. About 0.8 to 1.4 moles of the acid are used per mole of polyamine. The resulting polyamine-polyamides are reacted in aqueous solution at about 50° C. with about 0.5 to 1.8 moles of epichlorohydrin per secondary amino group, and about 0.9 to 1.5 moles of epichlorohydrin are preferably used.

The resin is applied, in an aqueous solution which contains about 0.3 to 2% by weight, preferably about 1 to 1.3% by weight of chlorohydrin resin, to the web intended for coating, preferably to the still moist, not yet dried cellulose hydrate gel web. However, it is also possible to apply the aqueous solution after the cellulose web has been dried, which indeed has the advantage that solutions with a lower resin content are required to obtain the same effect, but sometimes this leads to uneven impregnation. After application of the aqueous solution of the anchoring agent, the web is dried at a moderate heat (e.g., about 100° C.).

The gas-impermeable and sealable coating is, in particular, a thermoplastic copolymer which contains vinylidene chloride units and is usually present in a weight per unit area from about 3 to 12 g/m² on the web surface. In general, film-forming vinylidene resins can be used which contain at least about 5% by weight, but preferably at least about 80% by weight of vinylidene chloride in the polymerized molecule. Possible co-monomers include: vinyl chloride, vinyl bromide, vinyl acetate, vinyl propionate, vinyl chloroacetate, alkyl acrylate or methacrylate, for example the methyl, ethyl, propyl, butyl, isobutyl, methoxyethyl or chloroethyl acrylates or methacrylates, methyl vinyl ketone, methyl isopropenyl ketone, acrylonitrile, methacrylonitrile, styrene, vinylnaphthalene, ethyl vinyl ether, butyl vinyl ether, N-vinylphthalimide, N-vinylsuccinimide, N-vinyl-carbazole, diethyl methylene-malonate, unsaturated organic acids, such as itaconic acid, or mixtures of these compounds. This list is only exemplary and is not to be considered limiting. In addition to vinylidene chloride, the copolymer can contain one to three of these co-monomers. A suitable copolymer is, for example, composed of about 90 to 92% by weight of vinylidene chloride, about 5.5 to 7% by weight of acrylonitrile, about 1.5 to 3.5% by weight of methyl methacrylate and about 0.5 to 1.5% by weight of itaconic acid. A 0.1% by weight solution of this copolymer in a mixture of tetrahydrofuran and toluene in a volume ratio of 7:3 has a relative viscosity of 1.04 (23° C.), and a 3% by weight solution has a relative viscosity of 2.8 (23° C.) (German Offenlegungsschrift No. 2,832,926). Further preferred copolymers are described in U.S. Pat. Nos. 4,192,904 and 4,233,341, the disclosures of which are herein incorporated by reference.

The vinylidene resin can contain customary waxes, for example, those based on esterified montanic acids, polyolefin waxes or those based on oxazoline, and/or customary fillers, for example kaolin, in particular kaolin which has been rendered hydrophobic, silica or calcium carbonate (chalk) having a preferred mean grain size of about 1 to 3 μm.

The vinylidene resin, or a blend of the vinylidene resin, is used with or without other resins and plasticizers, such as, for example, esters of phthalic acid, such as dibutyl phthalate, esters of citric acid, such as tributyl acetylcitrate, or of sebacic acid or of tartaric acid, such as diisobutyl tartrate. Preferably, however, the resin is plasticizer-free.

The vinylidene resin is applied, together with an anchoring agent customary for this purpose, for example, with one of the above-mentioned, cured cationic thermosetting resins as the anchoring agent, or directly to the carrier web in the form of aqueous or non-aqueous mixtures, such as dispersions, emulsions, in the form of a latex, in the form of solutions in water or organic solvents, or in the form of melts. A 15 to 30% by weight solution in an organic solvent with an applied thickness of about 3 to 50, in particular about 3 to 12 μm, is preferred. During this step, the carrier web of regenerated cellulose can be in a dried, remoistened or not yet dried gel-like state. After application, the dispersing agent or solvent is removed, for example, by heating with hot air and/or by infrared heating. The web is usually dried down to a moisture content of less than about 15% by weight, preferably about 5 to 10% by weight. Further sintering of the coating at an elevated temperature is required only if particularly strong adhesion of the coating to the carrier is desired. In general, a coating thickness in the range from about 0.05 to 0.5 mm is adequate.

For packaging meat products in the form of sausage compositions, shirred, seamless tubular casings are used, as is known, which progressively unfold as the sausage composition is forced in. These shirred casings, also called concertinas or hollow rods or sticks in the trade, have hitherto been manufactured from long, seamless tubes which are conveyed in the direction of their longitudinal axis and are shirred against an opposing force, the length of the shirred casing usually being only about 1 to 3% of the original unshirred length.

The tubular casing according to the invention can also be shirred. This is particularly surprising since, because of the thickening in the sealing region as a result of the film strip covering the two edges, difficulties were to be expected during shirring. The tubular casing is shirred, for example, by the process known from U.S. Pat. Nos. 3,988,804 and 4,185,358, the disclosures of which are incorporated herein by reference, and by means of the equipment described therein. A shirring ratio of about 1:70 to 1:80 can readily be achieved.

A helical twisting of the casing and, consequently, twisting of the relatively thick seam zone about the longitudinal axis of the casing during the shirring process are also possible, but not necessary. This is effected, for example, by shirring devices known per se, such as are described, for example, in U.S. Pat. Nos. 2,819,488, 3,619,854, 3,594,857 and 3,766,603, the disclosures of which are incorporated herein by reference. The number of turns per 10 m of tube length is appropriately between about 0.5 and 10, and is chosen according to the degree of thickening in the seam zone and the width of the film strip.

Referring now to the drawings, in FIG. 1, a web 1 is unwound from a roll 2, is passed through drawing rollers 3 and through rollers 4 which control the edges of the web, and then is coated on both sides with viscose by means of a flat-web coater 5.

Subsequently, for precipitation and regeneration, the web 1 passes along spray nozzles 6a, 6b and 6c, from which regeneration fluid is applied to the web provided with viscose. The regeneration fluid issuing from the first pair 6a of nozzles is composed, for example, of about 20–80 g/l of sulfuric acid, about 200–350 g/l of ammonium sulfate and about 80–150 g/l of sodium sulfate and is at a slightly elevated temperature of about 35° to 50° C. The proportion of sulfuric acid is usually increased in the subsequent nozzles 6b and 6c. The web width is kept constant by means of the needle chains 7 engaging on the two edges of the web, so that the shrinkage in the transverse direction, which usually occurs on regeneration, is prevented. The fiber-reinforced web of cellulose hydrate gel then passes through the washing, desulfurization and plasticizing baths 8, shown diagrammatically, being guided over rollers 9. Predrying of the web takes place in the drying section 10 in which the web runs over drying rollers 11. On leaving this drying stage, the water content of the web is about 80 to 150% by weight. The edges of the web are then gripped by needle clip chains 12 and the web is led through a tenter frame 13, in which it is stretched in the transverse direction, and subsequently through several decks of a drying field 14. The web is then wound upon the roller 15. Idle rolls 16 are used most cases for deflecting the web and/or the clip chains.

Figure 2:
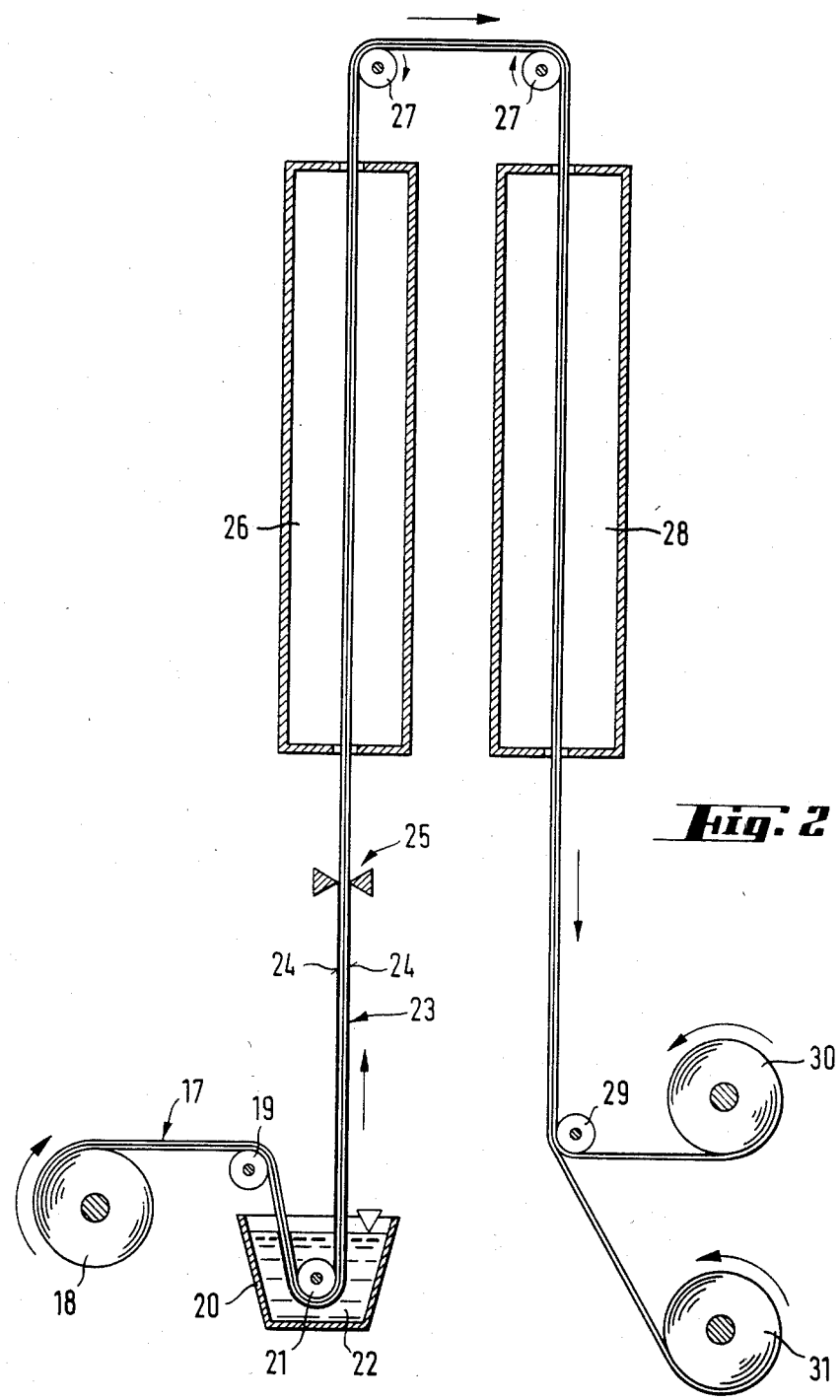
FIG. 2 schematically illustrates the coating of the fiber-reinforced web of regenerated cellulose with a gas-impermeable sealable layer.

The coating, which may be the anchoring layer or the gas-impermeable sealable coating, is applied to the web, for example, as illustrated in FIG. 2. The two-ply web 17, unwound from a stock roll 18, is passed, after running over the deflection roller 19, at a steady speed through a trough 20 containing coating fluid 22 and over an idle roller 21 located in the trough. The fluid is composed of a mixture of tetrahydrofuran/toluene in which a thermoplastic vinylidene chloride-containing copolymer (0.7% by weight) is dissolved. In addition, the solution advantageously contains wax and kaolin. The two-ply web 23 having the fluid coating 24 on the outside passes in an upward vertical direction through the gap which is formed by the blade 25 or by so-called doctor rollers and which sets a defined thickness of the coating on the surfaces of the web. The web is then led through the drying shaft 26 in which the liquid fractions of the coating are evaporated by the action of heat, and an annealed film coating is formed. After the deflection rollers 27, a second drying shaft 28 follows, which can also be used for reconditioning the web. At the deflection roller 29, the two plies are separated and are then wound up on the stock rolls 30 and 31.

In place of the coating of a two-ply web as shown in FIG. 2, one-sided coating using conventional coating devices is also possible.

Figure 3:
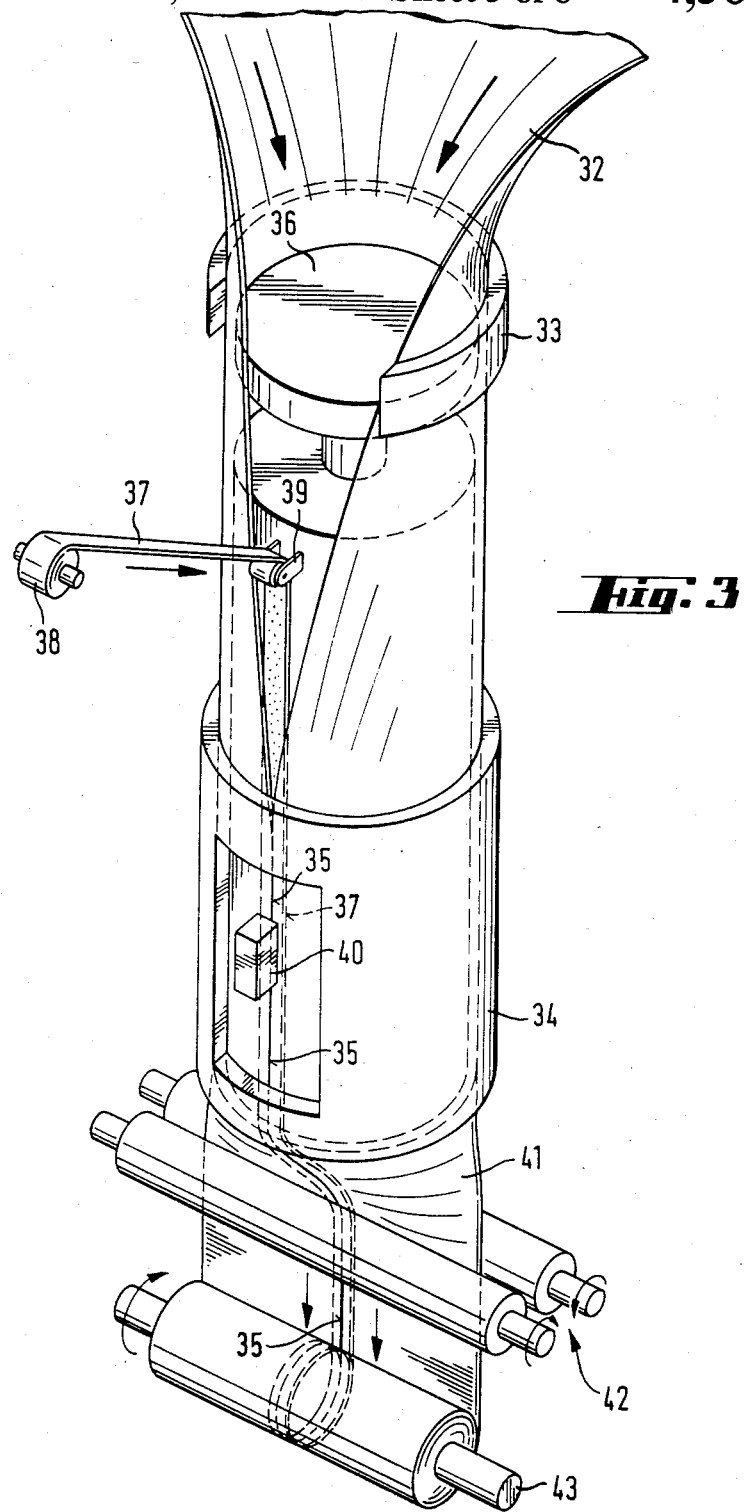
Figure 4:
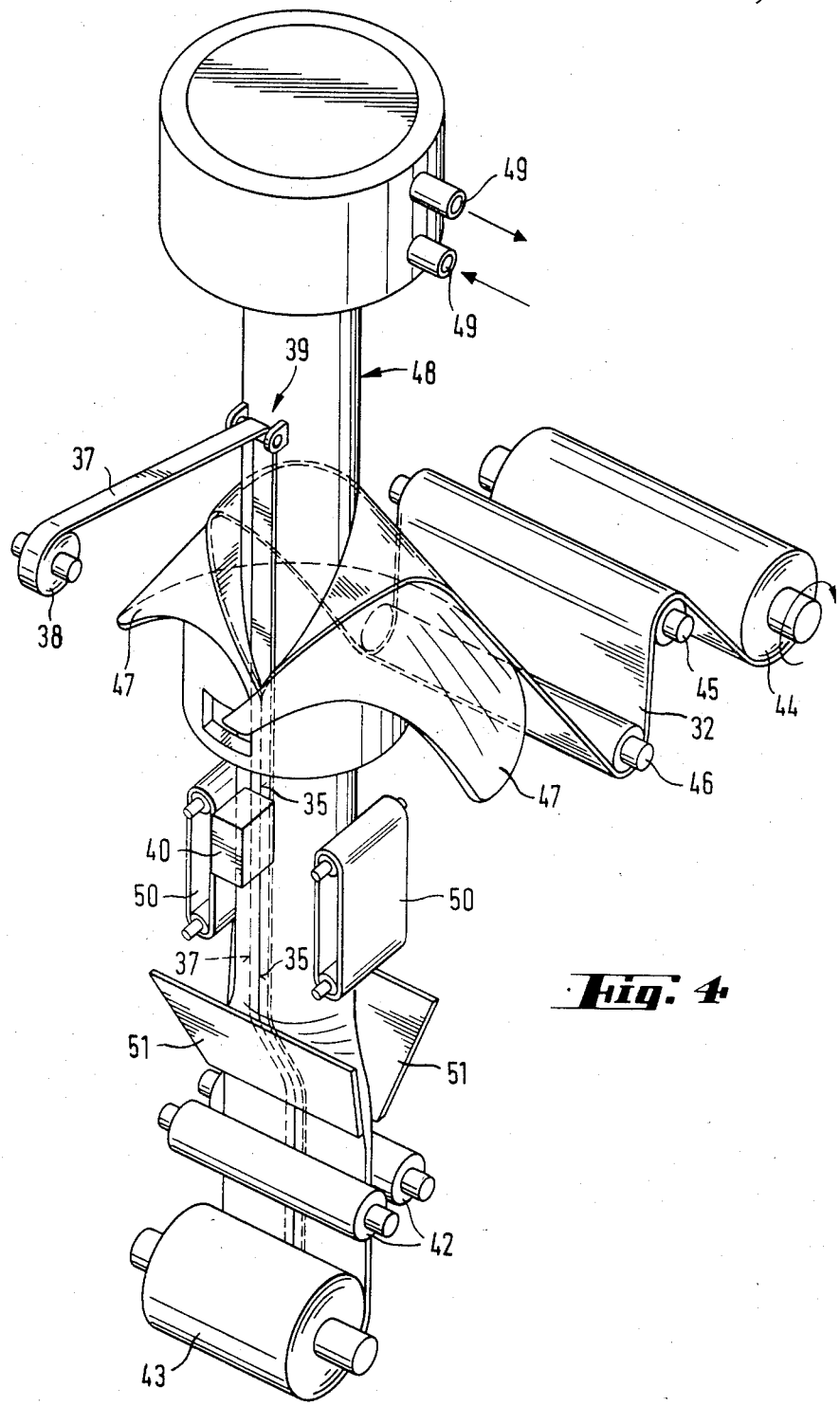

A tube is then formed from the web provided with a gas-impermeable and sealable layer, as shown, for example, in FIGS. 3, 4 or 7.

In FIG. 3, a fiber-reinforced web 32 of regenerated cellulose is passed through a ring segment 33 and shaped into a tube, the two edges approaching one another in the guide sleeve 34 to give a butt seam 35. The ring segment 33 and the guide sleeve 34 serve to assist the formation of the tube from the outside, while the cylindrical support element 36 located in the interior of the tube supports the tube from the inside. A film strip 37, composed of the same fiber-reinforced material as the web, is unwound from the roll 38 and passed via an eye-type holder 39 into the interior of the tube, the butt seam 35 being in the center of the film strip 37.

The heated sealing jaw 40 which can, for example, also have the form of a heated contact pressure roller, then seals the film strip 37 against the edge zones of the web which has been formed into a tube. The gas-impermeable and sealable layer is on the web surface which forms the inside of the tube. The film strip 37 is coated on both sides with the gas-impermeable and sealable material. The tube 41 is drawn off by the pair of rollers 42 and is wound up by means of the roll 43.

In place of the support element 36 in the interior of the tube formed, it is also possible for a filling, for example, sausage meat, to be present in the tube, which filling issues from a filling pipe of a filling apparatus at the same rate as that of the forward movement of the tube. Preferably, the filling pipe ends coaxially in the interior of the tube. Moreover, it is also possible to design the support element 36 as a filling pipe. In these cases, the formation of the tube takes place in one and the same working step as the manufacture of the sausages.

In an alternative shown in FIG. 4, the fiber-reinforced web 32 of regenerated cellulose is drawn off the roll 44 and passed over guide rollers 45 and 46 to a forming shoulder 47, where the tube is formed. The two edges of the web 32 approach one another with the formation of a butt seam 35. The cylindrical support element 48 is located in the interior of the tube, and it can be supplied with a coolant through the openings 49. Its external diameter corresponds to the internal diameter of the tube formed. A film strip 37, unwound from the roll 38, is passed over a guide element 39 to the interior of the tube, the butt seam 35 being in the center of the film strip 37.

The sealing jaw 40 is heated and is pressed on cyclically, the film strip 37 being sealed against the edge zones of the web which has been shaped into a tube. The gas-impermeable and sealable layer is on the web surface which forms the inside of the tube. The film strip is provided on both sides with a gas-impermeable and sealable surface layer, and it is composed of fiber-reinforced regenerated cellulose having the values, according to the invention, for the tensile strength and elongation at break.

On the outer surface of the tube, transport belts 50 push the tube cyclically down in the vertical direction. The tube passes metal sheets 51, which lay the tube flat, and a pair 42 of transport rollers and is then wound up on the roll 43.

A section of the tube is filled with sausage meat for cooked sausages by means of a conventional sausage-filling device and is then closed. The sausage is then cooked in water, in the customary manner, cooled and then stored in a refrigerating chamber.

A change in the dimensions of the sausage is not observable, either before or after the cooking process. It always exhibits a full rounded appearance and retains its uniform diameter. The weight loss after storage in a refrigerated chamber for one week is less than 1%. After a first cut has been made in the sausage casing, it can be opened and peeled off without effort by pulling the sealed-in film strip in the direction of the longitudinal axis.

Figure 5:
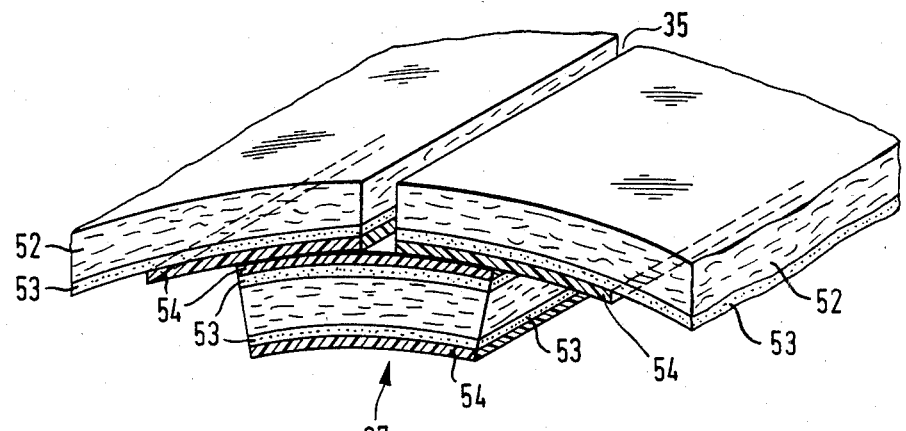
FIG. 5 is a detailed perspective view of the sealing region of the tube, in section viewed transversely to the axis.

FIG. 5 shows a section of the sealing region of the tube including the fiber-reinforced tube material of regenerated cellulose 52, the anchoring layer 53, the gas-impermeable and sealable layer on the edge zones 54 and the film strip 37. Only a small proportion of the material forming the anchoring layer 53 has penetrated into and through the tube 52, and this is not shown.

Figure 6:
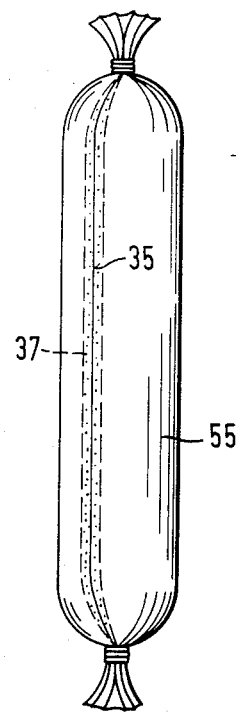
FIG. 6 is a plan view of the filled tubular casing according to the invention.

FIG. 6 shows the filled tubular casing 55 with a sealed-in film strip 37 on the inside, which covers the butt seam 35 in a substantially symmetrical manner.

In FIG. 7, the tube is produced analogously to the manner shown in FIG. 4. The reference numerals have the same meaning. In this example, however, the film strip is applied to the outside of the tubing, a heated sealing roller 56 being used for this purpose. To improve the contact of the roller 56 with the surfaces which are to be sealed, the tubular support element 48 used as a backing is provided in the sealing region with a bevelling 57. The support element 48 can also be designed as a filling pipe through which the filling is stuffed into the tube which has been formed.

The tubular casing of the invention possesses a strong seam and a strong casing material so that no damage is caused by the pressure arising on filling and by the swelling and shrinking forces which arise on cooking and cooling. The casing also has a uniform coagulated and regenerated layer of cellulose and an even coating of gas-impermeable material. It is suitable particularly for use as a sausage casing for boiling sausages and cooked sausages. Boiling sausages are to be understood, in particular, as types of Bologna sausage. Examples of cooked sausages are liver or blood sausage.

In order to more fully describe the present invention, the following non-limiting examples are provided.

EXAMPLE 1

A web of long-fibered hemp paper with a laid-flat width of 235 mm and a weight per unit area of 21 g/m² is unwound from a roll, is passed through drawing rollers and through rollers which control the edges of the web, and is coated on both sides with viscose by means of a flat-web coater. The gap width is 0.8 mm and the web speed is 5 m/minute.

Subsequently, for precipitation and regeneration, the web passes along spray nozzles from which regeneration fluid is applied to the web provided with viscose. The regeneration fluid issuing from the first pair of nozzles is composed of 30 g/l of sulfuric acid, 260 g/l of ammonium sulfate and 100 g/l of sodium sulfate and is at a slightly elevated temperature of about 35° to 50° C. The proportion of sulfuric acid is usually increased in the subsequent nozzles. The web width is kept constant by means of the needle chains engaging on the two edges of the web. The fiber-reinforced web of cellulose hydrate gel then passes through the washing, desulfurization and plasticizing baths, while being guided over rollers. The web of cellulose hydrate gel now has a width of 210 mm. Predrying of the web takes place in the drying section in which the web runs over drying rollers. On leaving this drying stage, the water content of the web is 80 to 150% by weight. The edges of the web are then gripped by needle clip chains, and the web is led through a tenter frame and subsequently through several decks of a drying field.

In the tenter frame, the web is stretched in the transverse direction to a width of 252 to 262 mm and is then dried, preferably at about 80° C., while it is still held at this width. The residual moisture content of the web wound up on the roller is about 14% by weight, and the web has a tensile strength of 52 N/mm² in the longitudinal direction, a tensile strength of 58 N/mm² in the transverse direction and an elongation at break of about 17.5% in both directions.

A two-ply web is passed at a steady speed through a trough containing coating fluid and over a deflection roller located in the trough. The fluid is composed of 400 parts by weight of a mixture of tetrahydrofuran/toluene (volume ratio 7:3), in which 100 parts by weight of a copolymer containing units of vinylidene chloride (91% by weight), acrylonitrile (6.2% by weight), methyl methacrylate (2.1% by weight) and itaconic acid (0.7% by weight) are dissolved. In addition, the solution contains wax and kaolin. The two-ply web having the fluid coating on the outside passes in an upward vertical direction through the gap which is formed by the blade or by so-called doctor rollers and which sets a defined thickness of the coating on the surfaces of the web. The web is then led through the drying shaft in which the liquid fractions of the coating are evaporated by the action of heat, hot air at about 115° C., and an unbroken film coating having a weight per unit of 10 g/m² is formed. After the deflection rollers, a second drying shaft follows, which is used for reconditioning the web, for remoistening it up to a water content of 8 to 10% by weight. Air saturated with water vapor at 80° to 98° C. is used for this purpose. At the deflection roller, the two plies are separated and are then wound up on the stock rolls.

A tube is then formed from the web provided with a gas-impermeable and sealable layer. The fiber-reinforced web of regenerated cellulose is passed through a ring segment and shaped into a tube, the two edges approaching one another in the guide sleeve to give a butt seam. The ring segment and the guide sleeve serve to assist the formation of the tube from the outside, while a cylindrical support element located in the interior of the tube supports the tube from the inside. A film strip, composed of the same fiber-reinforced material as the web, is unwound from a roll and passed via an eye-type holder into the interior of the tube, the butt seam being in the center of the film strip.

A heated sealing jaw, having the form of a heated contact pressure roller, then seals the film strip against the edge zones of the web which has been formed into a tube. The gas-impermeable and sealable layer is on the web surface which forms the inside of the tube. The film strip is coated on both sides with the gas-impermeable and sealable material. The tube is drawn off by the pair of rollers and is wound up by means of the roll.

EXAMPLE 2

This example is carried out as in Example 1, except in place of the support element in the interior of the formed tube, a filling of sausage meat is present in the tube. The filling issues from a filling pipe of a filling apparatus at the same rate as that of the forward movement of the tube. The filling pipe ends coaxially in the interior of the tube.

EXAMPLE 3

The formation of a two-ply regenerated cellulose web is identical here to that of Example 1. In this example, however, the fiber-reinforced web of regenerated cellulose is drawn off the roll and passed over guide rollers to a forming shoulder, where the tube is formed. The two edges of the web approach one another with the formation of a butt seam. The cylindrical support element is located in the interior of the tube, and it is supplied with a coolant through openings. Its external diameter corresponds to the internal diameter of the tube formed. A film strip, unwound from the roll, is passed over a eye-type guide element to the interior of the tube, the butt seam being in the center of the film strip.

The sealing jaw, heated to 130° C. and having a length of 200 mm, is pressed on cyclically under 2 bars, the film strip being sealed against the edge zones of the web which has been shaped into a tube. The gas-impermeable and sealable layer is on the web surface which forms the inside of the tube. The film strip is provided on both sides with a gas-impermeable and sealable surface layer, and it is composed of fiber-reinforced regenerated cellulose having the values, according to the invention, for the tensile strength and elongation at break. The film strip has a width of 10 mm so that the edge zones of the web are each covered for about 5 mm.

On the outer surface of the tube, transport belts push the tube cyclically down in the vertical direction by 150 mm each time. The tube passes metal sheets, which lay the tube flat, and a pair of transport rollers and is then wound up on a roll.

A section of the tube is filled with sausage meat for cooked sausages by means of a conventional sausage-filling device under a filling pressure of 0.3 bar, and is closed. The sausage is then cooked, in the customary manner, in water at 80° to 82° C. for one hour, is then cooled and is stored in a refrigerating chamber.

A change in the dimensions of the sausage is not observable, either before or after the cooking process. It always shows a full rounded appearance and retains its uniform diameter. The weight loss after storage in a refrigerated chamber for one week is less than 1%. After a first cut has been made in the sausage casing, it is opened and peeled off without effort by pulling the sealed-in film strip in the direction of the longitudinal axis.

EXAMPLE 4

The tube is produced analogously to the manner described in Example 3. In this example, however, the film strip is applied to the outside of the tubing, a heated sealing roller is used for this purpose. To improve the contact of the roller with the surfaces which are to be sealed, the tubular support element used as a backing is provided in the sealing region with a bevelling. The support element can also be designed as a filling pipe through which the filling is pressed into the tube which has been formed.

The tubular casing of the invention possesses a strong seam and a strong casing material so that no damage is caused by the pressure arising on filling and by the swelling and shrinking forces which arise on cooking and cooling. The casing also has a uniform coagulated and regenerated layer of cellulose and an even coating of gas-impermeable material. It is suitable particularly for use as a sausage casing for boiling sausages and cooked sausages.

While the invention has now been described in terms of various preferred embodiments and illustrated with respect to certain examples, it will be apparent to the skilled artisan that various omissions, substitutions, and modifications and the like may be made without departing from the spirit of the invention. Accordingly, it is intended that the scope of the present invention be determined with reference to the following claims.

What is claimed is:

1. A process for the manufacture of a tubular casing from a fiber-reinforced web of regenerated cellulose, comprising the steps of:
    coating a web-like fiber reinforcement with a viscose;
    regenerating said viscose to produce a cellulose hydrate gel;
    washing and drying said cellulose hydrate gel to free acids and salts from said cellulose hydrate gel and to produce said fiber-reinforced regenerated cellulose;
    preventing shrinkage of said fiber reinforcement during at least said regenerating and said drying steps by holding the longitudinally running edges of said fiber-reinforcement;
    transversely stretching said fiber reinforcement during drying by about 5 to 15% relative to the width of said fiber reinforcement before said viscose coating step;
    forming said fiber-reinforced regenerated cellulose into a tube; and
    bonding said longitudinally running edges of said fiber-reinforced regenerated cellulose by means of a film strip.

2. A process as defined in claim 1 further comprising the step of providing said cellulose hydrate gel or said fiber-reinforced web of regenerated cellulose with a gas-impermeable and sealable surface layer prior to forming said tube.

3. A process as defined in claim 2 further comprising applying an adhesion-promoting layer to said fiber web.

4. A process as defined in claim 3, wherein said adhesion-promoting layer and said gas-impermeable and sealing surface layer are applied simultaneously.

5. A process as defined in claim 3, wherein said gas-impermeable and sealing surface layer is applied subsequent to said adhesion-promoting layer.

6. A process as defined in claim 1, wherein said tubular casing is shirred.

7. A process as defined in claim 1, wherein said tube is filled with a semi-solid filling.

8. A process as defined in claim 7, wherein said filling is introduced simultaneously to the bonding of said film strip to said edges of said web.

9. A process as defined in claim 7, wherein said filling is introduced subsequent to the bonding of said film strip to said edges of said web.

10. A process as defined in claim 2, wherein said tube is filled with a semi-solid filling.

11. A process as defined in claim 1, wherein said fiber reinforcement is stretched by about 7 to 12% in the transverse direction, relative to the width of said reinforcement before said viscose coating step.

12. A process as claimed in claim 1, wherein said fiber reinforcement is prevented from shrinking by holding the longitudinally running edges of said fiber reinforcement from said regenerating step through said drying step.

13. A process as claimed in claim 1, comprising the further step of additionally preventing shrinkage of said fiber-reinforcement during said coating step by holding the longitudinally running edges of said fiber reinforcement.

14. A process as claimed in claim 12, comprising the further step of preventing the shrinking of said fiber reinforcement during said coating step by holding the longitudinally running edges of said fiber reinforcement.

15. A process as defined in claim 1, wherein said film strip comprises the same properties as said fiber-reinforced regenerated cellulose.

* * * * *